United States Patent [19]

Megenbier

[11] Patent Number: 5,149,466
[45] Date of Patent: Sep. 22, 1992

[54] WATER VAPORIZER

[76] Inventor: Karl H. Megenbier, 8 Holly Tree Close, Market Rasen, Lincolnshire, United Kingdom, LN8 3BP

[21] Appl. No.: 752,512
[22] PCT Filed: Feb. 27, 1990
[86] PCT No.: PCT/GB90/00307
§ 371 Date: Sep. 3, 1991
§ 102(e) Date: Sep. 3, 1991
[87] PCT Pub. No.: WO90/10150
PCT Pub. Date: Sep. 7, 1990

[30] Foreign Application Priority Data
Mar. 2, 1989 [GB] United Kingdom ............. 8904707

[51] Int. Cl.⁵ ........................................... F02M 25/02
[52] U.S. Cl. ............................... 261/18.2; 123/25 P
[58] Field of Search ................. 123/25 P; 261/18.2

[56] References Cited

U.S. PATENT DOCUMENTS

| | | | |
|---|---|---|---|
| 1,304,019 | 5/1919 | Brown | 261/18.2 |
| 2,927,561 | 3/1960 | Eggers | 261/18.2 |
| 4,466,386 | 8/1984 | Silva | 123/25 P |
| 4,986,223 | 1/1991 | Mahoney | 123/25 P |

FOREIGN PATENT DOCUMENTS 2081377  2/1982  United Kingdom .

*Primary Examiner*—Tim Miles
*Attorney, Agent, or Firm*—Fleit, Jacobson, Cohn, Price, Holman & Stern

[57] ABSTRACT

A water vaporizer system for supplying steam to internal combustion engines, comprising a water boiler (7) on the exhaust conduit, which supplies steam to a steam reservoir (2,107) wherein it is mixed with air and supplied to the air intake.

3 Claims, 2 Drawing Sheets

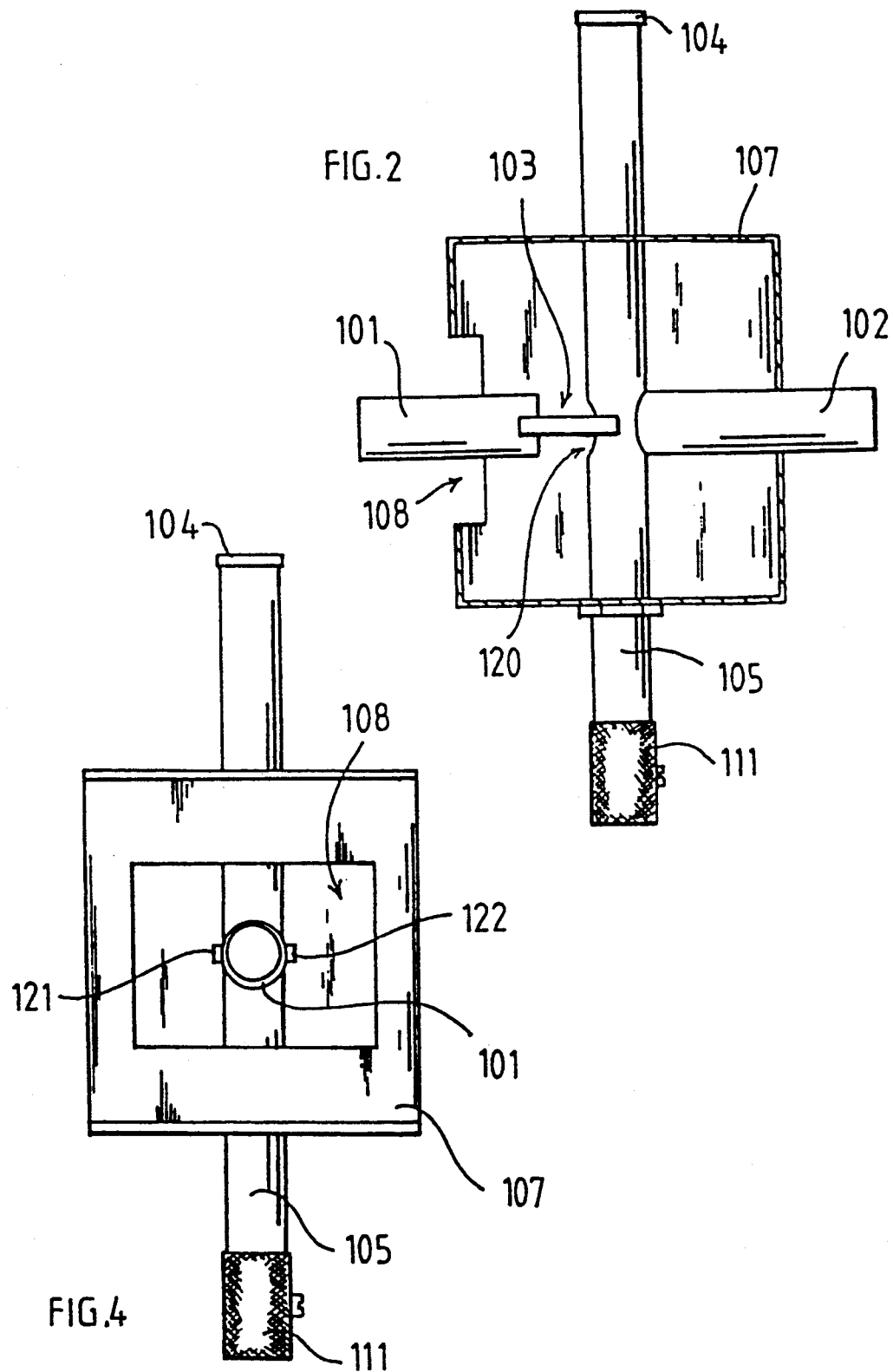

WATER VAPORIZER

TECHNICAL FIELD OF THE INVENTION

This invention relates to a water vapouriser device for supplying steam to a diesel or petrol engine.

BACKGROUND

GB 2 081 377 A discloses a water vaporiser device for supplying steam to the air intake of a diesel or petrol engine having an exhaust system, the water vapouriser device comprising:

a water boiler in heat exchange relation with the exhaust system of the engine, and a steam reservoir having a steam inlet arranged to receive steam from the boiler, an air inlet, and an outlet arranged to supply steam to the air intake of the engine.

SUMMARY OF THE INVENTION

The present invention proposes a water vapouriser device for supplying steam to the air intake of a diesel or petrol engine having an exhaust system, the water vapouriser device comprising:

a water boiler (7) for mounting in heat exchange relation with the exhaust system of the engine, and a steam reservoir (2) comprising a housing (107) having a steam inlet (101) for receiving steam from the boiler in use, an air inlet (105), and an outlet (102) for supplying steam to the air intake of the engine, characterised in that the steam inlet and outlet of the steam reservoir comprise inlet and outlet pipes (101, 102) which project into the housing (107), the pipes having respective openings within the housing which are separated by a gap (103).

BRIEF DESCRIPTION OF THE DRAWINGS

The invention is exemplified in the accompanying drawings, in which:

FIG. 2 is a part-sectioned side view of the steam reservoir of the water vapouriser device, FIG. 4 is an end view of the steam reservoir of FIG. 2 looking from the left in FIG. 2.

DETAILED DESCRIPTION OF THE DRAWINGS

Figure 1:
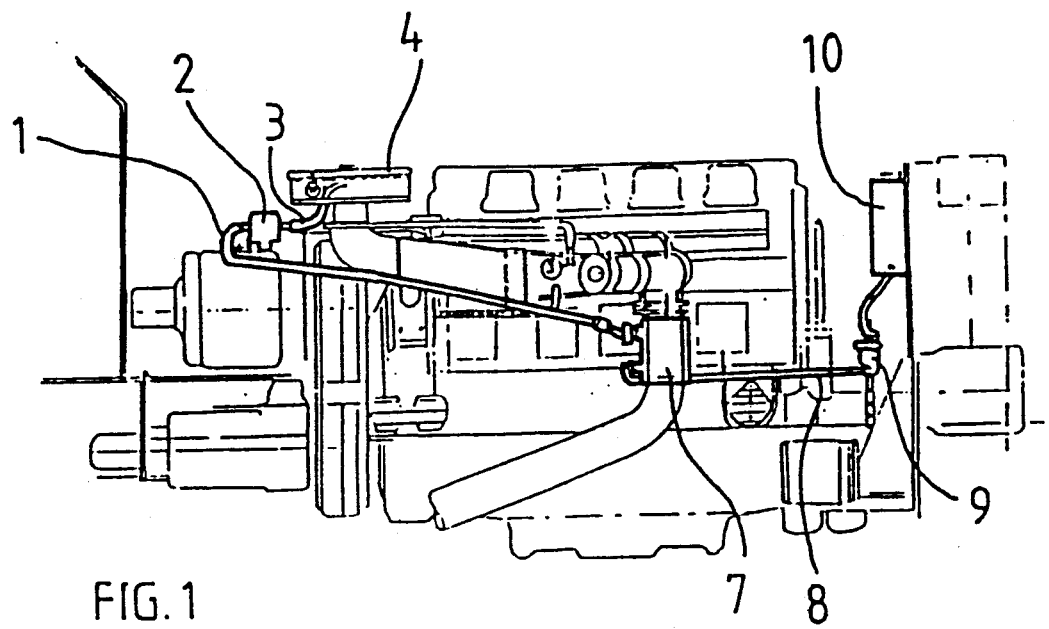
FIG. 1 is a diagram of part of an engine incorporating a water vapouriser device of the invention.

FIG. 1 shows a water vapouriser of the invention applied to an engine. A water tank 10 is connected via a float chamber 9 and tubing 8 to a steam generator (boiler) 7 applied to the engine's exhaust. A steam tube 1 travels from the boiler 7 to a steam reservoir (condenser) 2, from which a steam tube 3 travels to the engine's air intake 4.

The water vapouriser has only two moving parts; a float and a needle valve.

The generator 7 produces steam which is fed through the link pipe 1 into the steam reservoir 2. The steam is then fed into the venturi of the carburettor in the case of a petrol engine, or into the intake manifold in the case of a diesel engine.

Figure 3:
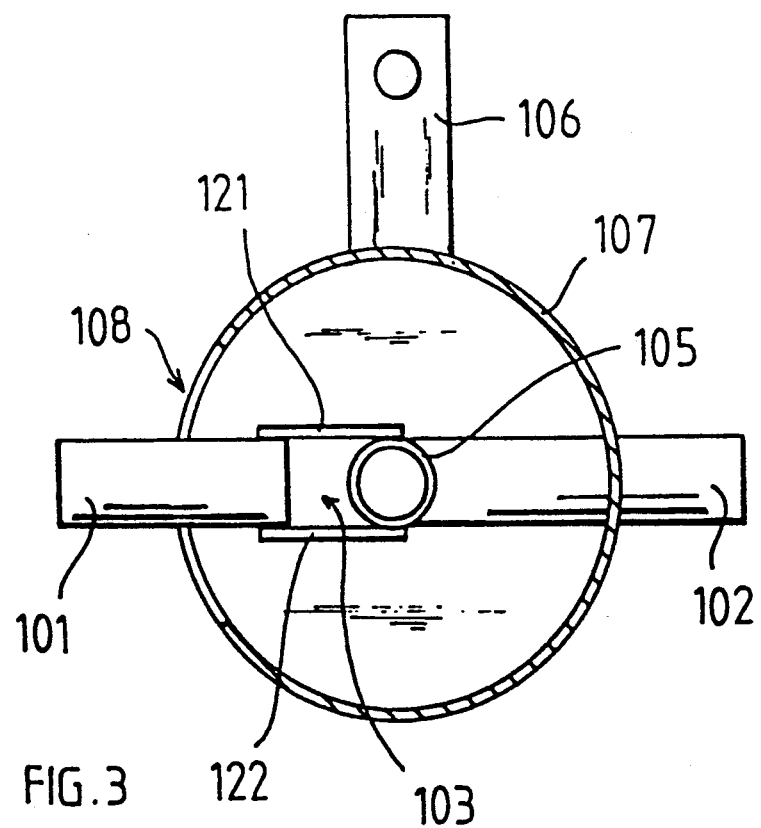
FIG. 3 is a part-sectioned plan view of the steam reservoir of FIG. 2.

As shown in FIGS. 2 to 4, the steam reservior 2 comprises a cylindrical housing 107 having an air intake window 108 in its side wall. An air inlet pipe 105 passes axially through the housing 107, one end of the pipe 105 being provided with a filter 111 and the opposite end being provided with a plastics cap 104. A steam inlet pipe 101 passes through the window 108 and is held opposite an opening 120 in the side of the air inlet pipe 105 by straps 121 and 122 leaving a gap 103 between the end of the steam inlet pipe 101 and the opening 120. An outlet pipe 102 is secured to the air inlet pipe 105 directly opposite the opening 120, and passes out of the housing 107. The housing is provided with an external bracket 106.

The steam is fed through the condenser 2 so that the steam produced is wet. This is one of the key factors to the success of the water vapouriser. The condenser 2 also acts as a steam reservoir, thus ensuring a constant supply for sudden acceleration. Any steam produced is collected in the air stream and fed directly into the carburettor, eliminating the need for steam pressure. By feeding the steam directly into the venturi (or intake manifold) an even mixture of steam with the air and petrol vapour is ensured.

The device is self-metering in that it is controlled by the heat from the exhaust as well as being connected to the intake 4 of the carburettor. When the throttle is opened the pressure acting on the surface of the water inside the generator 7 is reduced, thus enabling steam to be produced at a lower temperature. The level of water in the generator 7 is controlled at a constant level by the float chamber 9.

When the mixture arrives in the cylinder of the engine it acts to slow or control the burn, thus enabling the use of a lower grade fuel. Immediately the engine fires the wet steam converts to dry steam, and in so doing increases in volume. When the cylinder temperature reaches 1,000 degrees Celsius, the dry steam converts back to hydrogen and oxygen, which are two combustible gases. This gives a second, or continued burn which, in response, burns the hydrocarbons, thus eliminating smoke from the exhaust, and so helping to eliminate pollution from the environment. This burning of the hydrocarbons gives "new engine" performance, extra power and less wear, particularly to valves etc.

One important safety feature in the system is that wet steam cannot be fed into a cold engine. Steam cannot be produced until the engine is hot. Laboratory tests for possible water contamination of the oil after a normal 6,000 mile oil change have concluded: "There is no effect of the steam generating system on the condition of the oil".

The device is useful in both petrol and diesel engines as $NO_x$ is controlled in both.

The water vapouriser can save up to twenty percent on fuel bills—petrol and diesel. Other advantages may be summarised as:

Less pollution
Increased power output
Smoother running
A cleaner engine
No exhaust smoke
Lower octane petrol.

I claim:

1. A water vapouriser device for supplying steam to the air intake of a diesel or petrol engine having an exhaust system, the water vapouriser device comprising:

a water boiler (7) for mounting in heat exchange relation with the exhaust system of the engine, and a steam reservoir (2) comprising a housing (107) having a steam inlet (101) for receiving steam from the boiler in use, an air inlet (105), and an outlet (102) for supplying steam to the air intake of the engine, characterised in that the steam inlet and outlet of the steam reservoir comprise inlet and outlet pipes (101, 102) which project into the housing (107), the pipes having respective openings within the housing which are separated by a gap (103).

2. A water vapouriser device according to claim 1, in which the air inlet comprises an air inlet pipe (105) which projects into the housing (107) and joins the outlet pipe (102) such that the air inlet pipe and the outlet pipe share a common opening (120) within the housing.

3. A water vapouriser device according to claim 1, in which the air inlet (105) is provided with a filter (111).

* * * * *